US008521899B2

(12) United States Patent
Narula et al.

(10) Patent No.: US 8,521,899 B2
(45) Date of Patent: Aug. 27, 2013

(54) MULTI-OUT MEDIA DISTRIBUTION SYSTEM AND METHOD

(75) Inventors: Aashima Narula, Seattle, WA (US); Steve McMillen, Seattle, WA (US); Chytanya Karusala, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 12/838,325

(22) Filed: Jul. 16, 2010

(65) Prior Publication Data

US 2011/0276712 A1 Nov. 10, 2011

Related U.S. Application Data

(60) Provisional application No. 61/331,639, filed on May 5, 2010.

(51) Int. Cl.
*G06F 15/16* (2006.01)

(52) U.S. Cl.
USPC .......................................... 709/231; 725/86

(58) Field of Classification Search
USPC ................... 709/230–236; 725/86–100, 105, 725/143–148
See application file for complete search history.

(56) References Cited

U.S. PATENT DOCUMENTS

| 7,093,274 | B2* | 8/2006 | Dawson et al. | 725/93 |
|---|---|---|---|---|
| 2003/0103563 | A1* | 6/2003 | Amini et al. | 375/240.03 |
| 2004/0057465 | A1* | 3/2004 | Chen et al. | 370/474 |
| 2004/0098748 | A1* | 5/2004 | Bo et al. | 725/105 |
| 2005/0028225 | A1* | 2/2005 | Dawson et al. | 725/146 |
| 2005/0223107 | A1* | 10/2005 | Mine et al. | 709/231 |
| 2005/0254499 | A1* | 11/2005 | Leon et al. | 370/394 |
| 2005/0275752 | A1* | 12/2005 | Li et al. | 348/398.1 |
| 2008/0137541 | A1* | 6/2008 | Agarwal et al. | 370/241 |
| 2009/0089445 | A1* | 4/2009 | Deshpande | 709/231 |
| 2009/0150945 | A1* | 6/2009 | Park et al. | 725/87 |
| 2010/0228875 | A1* | 9/2010 | Myers | 709/231 |
| 2011/0032880 | A1* | 2/2011 | Ozawa | 370/328 |
| 2011/0093900 | A1* | 4/2011 | Patel et al. | 725/54 |
| 2011/0138064 | A1* | 6/2011 | Rieger et al. | 709/228 |
| 2012/0011270 | A1* | 1/2012 | Priddle et al. | 709/231 |

OTHER PUBLICATIONS

"Wowza Unifies Media Streaming, Sets Performance Recordand Slashes Costs with Production Launch of Wowza MediaServer 2 for Flash, iPhone and Beyond," Press Release, http://www.wowzamedia.com/2009-12-17.html.
"Wowza Media Server 2 Advanced Gains More Than 1,000 Beta Customers and First Production Deployments," Press Release, http://www.wowzamedia.com/2009-11-04.html.

* cited by examiner

*Primary Examiner* — Shirley Zhang
(74) *Attorney, Agent, or Firm* — ÆON Law; Adam L. K. Philipp

(57) ABSTRACT

To deliver a digital media stream to remote clients of differing client types that support the original encoding format of the digital media stream, but that do not support the original container format of the digital media stream, a media distribution server may, for each request that it receives for the digital media stream, dynamically repackage the media stream into a container format and delivery protocol supported by the requesting remote client. The repackaged media stream includes the digital media data of the original digital media stream encoded unchanged in its original encoding format, but the encoded media data is re-packetized according to the container format and delivery protocol determined to be supported by the requesting remote client.

16 Claims, 11 Drawing Sheets

MULTI-OUT MEDIA DISTRIBUTION SYSTEM AND METHOD

RELATED REFERENCES

This application is a nonprovisional application of U.S. Provisional Application No. 61/331,639; filed May 5, 2010; titled "Single In, Multiple Out Media Server"; naming inventors Aashima Narula, Steve McMillen, and Chytanya Karusala. The above-cited application is incorporated herein by reference in its entirety, for all purposes.

FIELD

The present disclosure relates to packaging and distributing digital-media content, and more particularly to packaging and distributing digital-media content for multiple client types, each supporting different container formats and/or distribution protocols.

BACKGROUND

Media content (e.g., music, still images, video, and the like) may be digitally encoded in one of many public or proprietary formats and sent as a file and/or streamed to consumers, optionally including the use of digital rights management ("DRM") technologies to authenticate and authorize use of the content. For example, FIG. 1 illustrates a conceptual overview of various stages a piece of digital media content passes through from being captured by an analog-digital convertor as raw digital media data 135 to being streamed to a client device 105. Many different media distribution systems may be assembled to implement the various conceptual stages illustrated in FIG. 1, including previously-known distribution systems such as system 200, illustrated in FIG. 2 and discussed below.

For certain types of media content (especially time-based media such as video, and to a lesser extent, audio) raw digital media data 135 may have a very high bit-rate and may consequently be difficult to stream across many commonly-used networking technologies. Accordingly, raw digital media data 135 is often encoded 110 into an encoded form 137 according to one or more encoding formats (also known as coder-decoders or "codecs"). For example, video digital media data (or a video portion of multi-media digital media data) is commonly encoded using a lossy compression encoding format such as H.264/MPEG-4 Advanced Video Coding (hereinafter "H.264"), Windows Media Video ("WMV"), VP8, and the like. Similarly, audio digital media data (or an audio portion of multi-media digital media data) is commonly encoded using a lossy compression encoding format such as Advanced Audio Coding ("AAC"), Audio Data Transport Stream ("ADTS"), MPEG-1 Audio Layer 3 ("MP3"), Windows Media Audio ("WMA"), and the like. Lossless encoding formats also exist, but are less commonly used in streaming media contexts. Encoding raw digital media data 135 tends to be a relatively resource-intensive process compared to packaging and packetizing encoded media (as discussed below).

Prior to being distributed, encoded digital media data 137 is commonly packaged 115 or wrapped into a "container" according to a container format. In the digital media context, a container format is a meta-file format whose specification describes how encoded data and metadata are stored (as opposed to how digital media data is encoded). In most cases, the container format specifies the content and/or the arrangement of various aspects of a packaged container file, including the container file header, some or all of the metadata, and/or synchronization information. Simpler container formats (e.g., Audio Interchange File Format or "AIFF," Waveform Audio File Format or "WAV," and the like) can contain different types of audio codecs. More advanced container formats can support multiple audio and video streams, subtitles, chapter-information, meta-data, and the like, as well as synchronization information needed to play back the various streams together. Commonly used more-advanced container formats include 3GP (or 3GPP) container format; 3G2 (or 3GPP2) container format; MPEG-4 Part 14 ("MP4") container format; F4V Flash Video container format; MPEG transport stream ("MPEG-TS") container format as specified in MPEG-2 Part 1, Systems; Advanced Systems Format ("ASF"), Audio Video Interleave ("AVI"); and the like. Many of these commonly used container formats are based on or otherwise related to the MPEG-4 Part 12 ISO base media file format.

Prior to being distributed to client 105, encoded digital media data 137 packaged 115 in container 140 is commonly packetized 120 according to a delivery protocol. In the streaming digital media context, a "delivery protocol" is typically an Application Layer protocol within the Internet Protocol Suite that is used for streaming packaged, encoded digital media content across a network. Commonly used delivery protocols include Real Time Streaming Protocol ("RTSP"), Real Time Messaging Protocol ("RTMP"), Hypertext Transfer Protocol ("HTTP") Live Streaming, and Windows Media HTTP Streaming Protocol ("MS-WMSP" or "MMSH"). Furthermore, RTSP is commonly used in combination with the Real Data Transport protocol ("RDT") or Real-time Transport Protocol ("RTP"). In some cases, a particular delivery protocol is associated with a particular container format (or visa verse). For example, the RTMP delivery protocol is commonly associated with the F4V Flash Video container format. By contrast, RTP supports a number of different container formats, including H.264, MP4, et al.

Delivery protocols often call for packaged, encoded digital media data to be split into fragments (referred to herein as "media packets" 145) for delivery to a client. For example, according to the RTMP delivery protocol, the default size for a media packet is 128 bytes for video data and 64 bytes for audio data. Similarly, the HTTP Live Streaming protocol specifies that a distribution server must divide the stream into individual media files whose duration is approximately equal.

The process of splitting packaged, encoded digital media into media packets is referred to herein as "packetizing" or "packetization." The inverse process (i.e., joining media packets back into packaged, encoded digital media data) is similarly referred to as "de-packetizing." The packetization process for streaming delivery often proceeds according to specifications set out in one or both of the acting delivery protocol and the pertinent container format. For example, as the MPEG-TS container format is designed in part for transmission of encoded digital media data, the MPEG-TS container format is specified to encapsulate packetized elementary streams ("PES") comprising media packets consisting of a number of header fields and 188 bytes of encoded digital media payload. When streaming an MPEG-TS container, for example, a distribution server may use the MPEG-TS-specified media packets when dividing the stream into individual media files whose duration is approximately equal, as specified by the HTTP Live Streaming protocol.

Finally, the packetized, packaged, encoded digital media 145 can be delivered 125 to a client device 105, which would typically de-packetize the media packets 145 and read the encoded digital media data out of the re-constructed container. The delivery would typically involve sending the media packets 145 according to one or more Transport Layer, Internet Layer, and/or Link Layer protocols, all of which are managed by standard networking components.

DESCRIPTION

Figure 1:
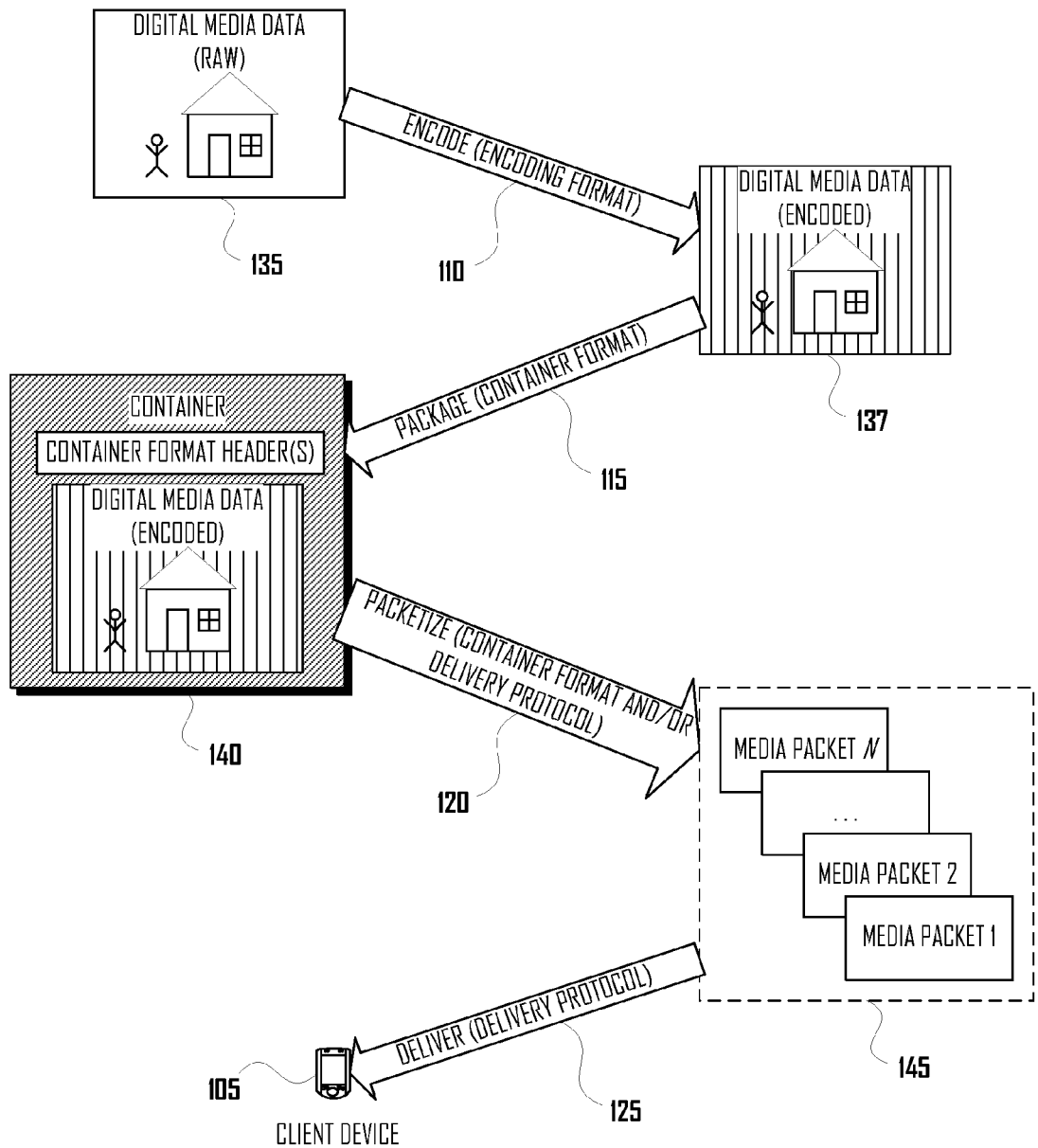
FIG. 1 illustrates a conceptual overview of various stages a piece of digital media content passes through in an exemplary streaming scenario, as previously known in the art.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 2:
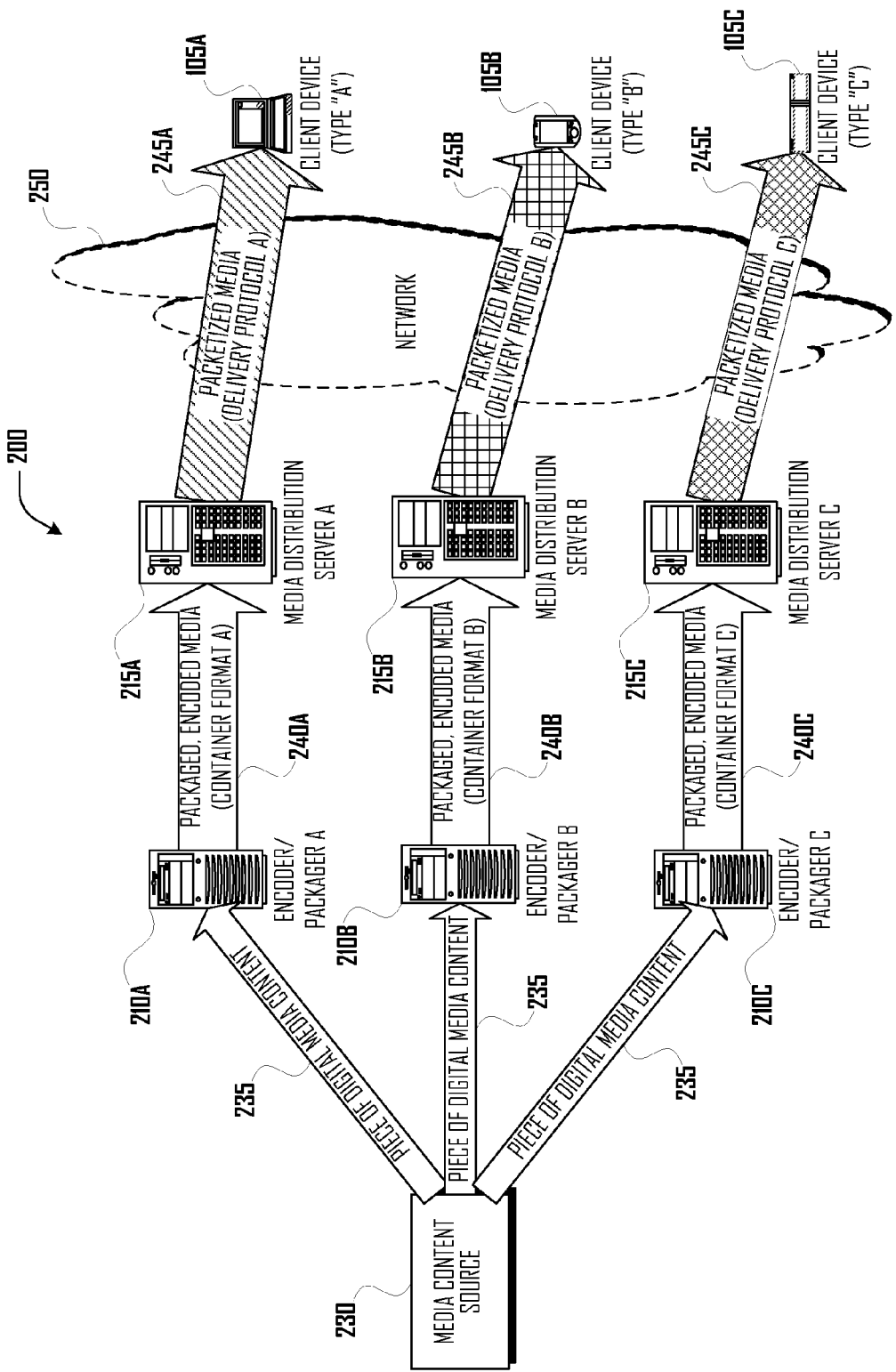
FIG. 2 illustrates a previously known media distribution system.

One complication with the conceptual overview illustrated in FIG. 1, discussed above, is that different types of client may require differing container formats and/or delivery protocols to be able to consume a given piece of encoded digital media data. Previously known media distribution systems, such as that illustrated in FIG. 2, addressed this complication by using multiple distribution servers 215A-C, each for a particular type of client. In FIG. 2, a media content source 230 is connected to encoder/packagers 210A-C, which are connected to media distribution servers 215A-C, which are connected via network 250 to client devices 105A-C.

A single piece of digital media content 235 is provided to each of encoder/packagers 210A-C, each of which encodes and packages the digital media content 235 according to encoding and container formats appropriate for a particular type of client. Encoder/packagers 210A-C respectively provide packaged, encoded media containers 240A-C to media distribution servers 215A-C, each of which packetizes its packaged, encoded media container according to a delivery protocol suitable for a particular type of client. Media distribution servers 215A-C respectively deliver packetized, packaged, encoded digital media 245A-C to clients 105A-C of a particular type via network 250.

However, as can be seen from FIG. 2, previously known media distribution systems may require media distributors to maintain multiple encoder/packagers and multiple distribution servers in order to serve multiple client types, which can lead to needless redundancy and expense, especially when different client types support a single encoding format, but require different container formats and/or delivery protocols.

Figure 3:
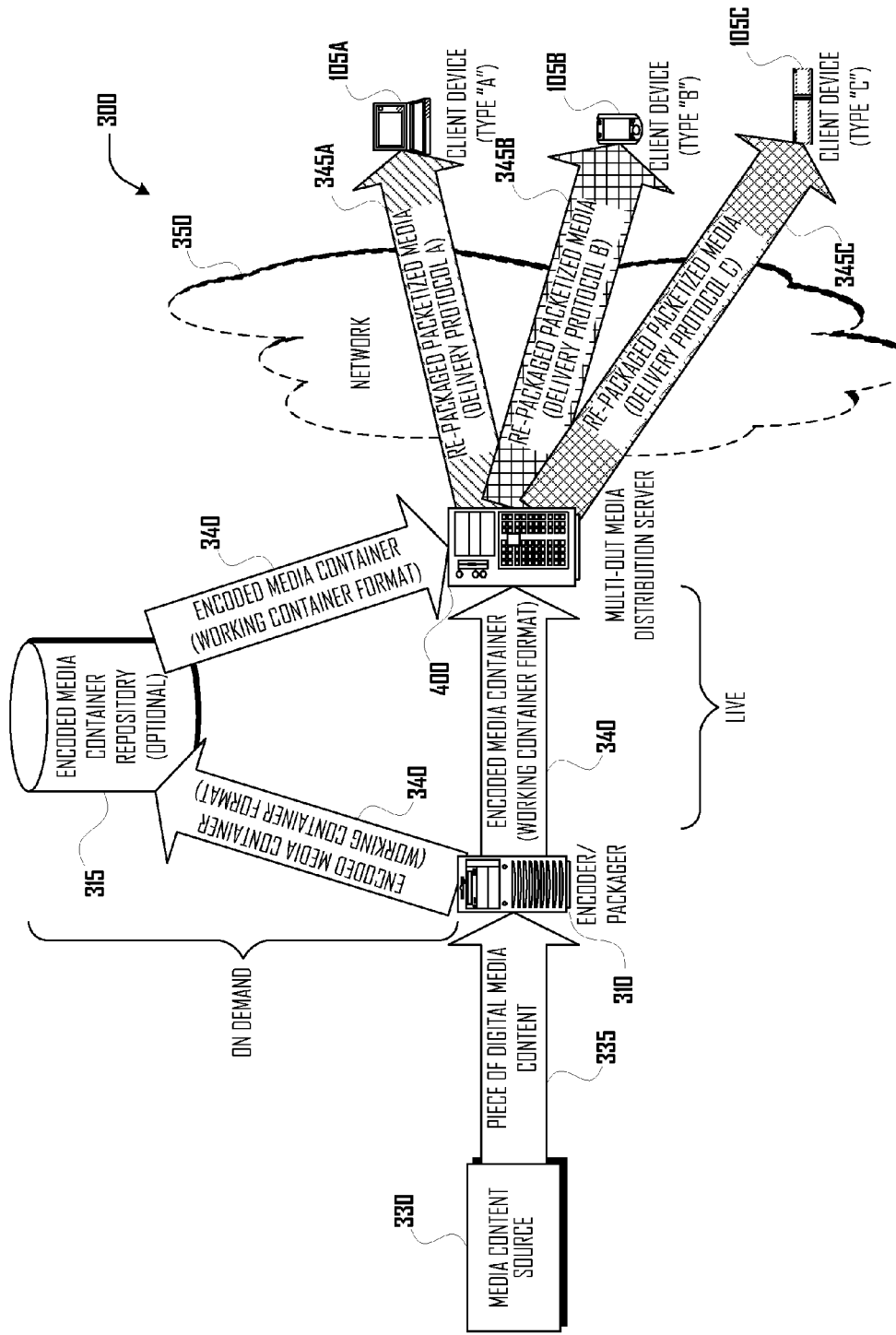
FIG. 3 illustrates an exemplary media distribution system according to one embodiment.

Many different media distribution systems may be assembled to implement the various conceptual stages illustrated in FIG. 1, including previously-known distribution systems such as system 200, illustrated in FIG. 2 and discussed above, as well as system 300, illustrated in FIG. 3, which illustrates one embodiment of a previously-unknown media distribution system as discussed throughout the remainder of this disclosure. FIG. 3 illustrates an exemplary media distribution system 300 according to one embodiment in which client devices 105A-C and multi-out distribution server 400 (see FIG. 4, discussed below) are connected to a network 350. At least one media content source 330 is communicatively coupled to at least one encoder/packager 310, which is communicatively coupled to multi-out distribution server 400 and/or encoded media container repository 315. In some embodiments, encoded media container repository 315 may also be communicatively coupled to multi-out distribution server 400. In some embodiments, at least one media content source 330, at least one encoder/packager 310, and/or encoded media container repository 315 may also be connected to network 350.

In various embodiments, media content source 330 may include components for digitizing and/or processing a live media stream. Media content source 330 provides at least one piece of digital media content 335 to encoder/packager 310. Encoder/packager 310 encodes the piece of digital media content 335 according to at least one common encoding format ("common" in the sense that the encoding format is decodable by multiple different client types, including clients 105A-C). For example, at the present time, the H.264 video encoding format and the AAC audio encoding format are supported by many types of client software (e.g., RealPlayer clients, QuickTime clients, Windows Media clients, Silverlight clients, Flash clients, and the like) running on many types of client hardware (e.g., desktop and laptop computers, set-top boxes, personal media players, many types of mobile phone, and the like). Accordingly, in one embodiment, encoder/packager 310 may encode video portions (if any) of the piece of digital media content 335 according to the H.264 encoding format, and it may encode audio portions (if any) of the piece of digital media content 335 according to the AAC encoding format.

After encoding the piece of digital media content 335 according to at least one common encoding format, encoder/packager 310 packages the encoded media into a working container format that is supported by multi-out distribution server 400. In some embodiments, one or more different client types may support (be capable of reading) the working container format. In other embodiments, the working container format may not be supported by any of the different client types.

After the piece of digital media content 335 has been encoded into the common encoding format(s) and packaged into the working container format, encoder/packager 310 provides the encoded media container 340 to multi-out distribution server 400 for imminent delivery to one or more of clients 105A-C (e.g., in a "live" streaming scenario), and/or encoder/packager 310 provides the packaged, encoded media 340 to encoded media container repository 315 for storage and subsequent delivery to one or more of clients 105A-C (e.g., in an "on-demand" streaming scenario).

Multi-out distribution server 400 obtains an encoded media container 340 (or a portion thereof) from encoded media container repository 315 and/or encoder/packager 310. In an "on-demand" streaming scenario, multi-out distribution server 400 may obtain the encoded media container 340 by reading a container file stored in encoded media container repository 315.

In a "live" streaming scenario, encoder/packager 310 may provide the encoded media container 340 to multi-out distribution server 400 by packetizing the encoded media container 340 and streaming it to multi-out distribution server 400 according to a working delivery protocol that is supported by multi-out distribution server 400. In some embodiments, one or more different client types may support (be capable of de-packetizing) the working delivery protocol. In other embodiments, the working delivery protocol may not be supported by any of the different client types.

Having obtained the encoded media container 340, multi-out distribution server 400 re-packages the encoded media stored in the container according to container formats, that are respectively determined to be supported by one or more requesting clients 105A-C. In some embodiments, re-packaging the encoded media may further include including packetizing or re-packetizing the container according to delivery protocols that are respectively determined to be supported by one or more requesting clients 105A-C. For each of the requesting clients 105A-C, multi-out distribution server 400 streams, delivers, or otherwise provides the re-packaged containers to the respective requesting clients 105A-C.

In some embodiments, other servers and/or devices (not shown) may also be present. For example, in some embodiments, one or more multi-out distribution servers 400 may be part of a larger content distribution network (not shown) and/or may be configured as edge servers between a content provider network (not shown) and a client network (e.g., network 350). In some embodiments, one or more proxy devices, firewalls, and/or other intermediaries (not shown) may exist between multi-out distribution server 400 and some or all of clients 105A-C.

In some embodiments, multi-out distribution server 400 may communicate with encoder/packager 310 and/or encoded media container repository 315 via network 350, a storage area network ("SAN"), a high speed serial bus, and/or via other suitable communication technology. In some embodiments, multi-out distribution server 400, encoder/packager 310, and/or encoded media container repository 315 may comprise one or more replicated and/or distributed physical or logical devices.

In various embodiments, network 350 may include the Internet, a local area network ("LAN"), a wide area network ("WAN"), a cellular data network, and/or other data network. In many embodiments, there may be more client devices 105 than are illustrated.

Figure 4:
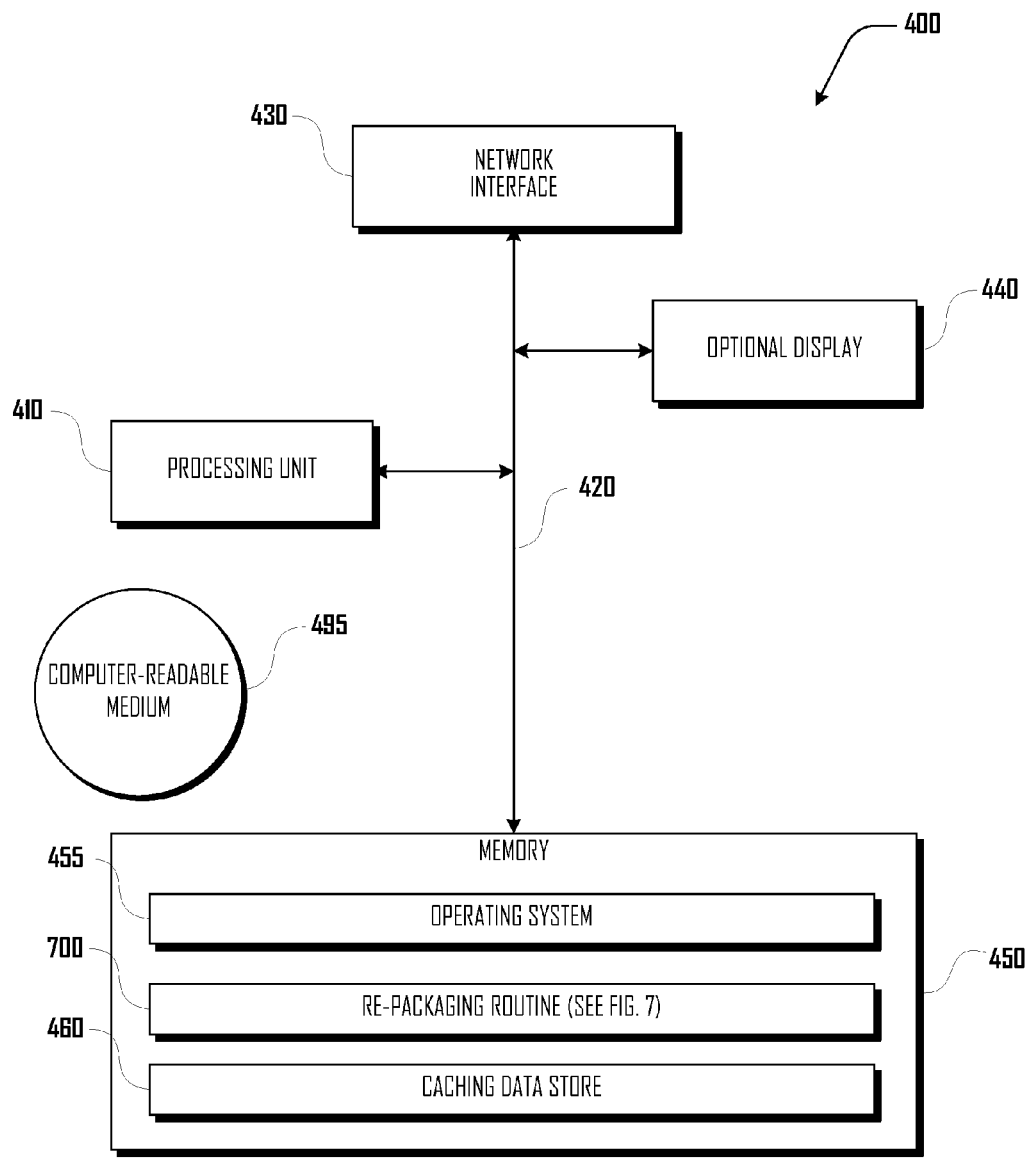
FIG. 4 illustrates several components of an exemplary multi-out distribution server, in accordance with one embodiment.

FIG. 4 illustrates several components of an exemplary multi-out distribution server 400. In some embodiments, multi-out distribution server 400 may include many more components than those shown in FIG. 4. However, it is not necessary that all of these generally conventional components be shown in order to disclose an illustrative embodiment. As shown in FIG. 4, multi-out distribution server 400 includes a network interface 430 for connecting to the network 350.

The multi-out distribution server 400 also includes a processing unit 410, a memory 450, and an optional display 440, all interconnected along with the network interface 430 via a bus 420. The memory 450 generally comprises a random access memory ("RAM"), a read only memory ("ROM"), and a permanent mass storage device, such as a disk drive. The memory 450 stores program code for a media re-packaging routine 700 (see FIG. 7, discussed below). In addition, the memory 450 also stores an operating system 455 and may include a caching data store 460, in which encoded media in various stages of processing may be cached for re-use. These software components may be loaded from a computer readable storage medium 495 into memory 450 of the Multi-out distribution server 400 using a drive mechanism (not shown) associated with a non-transient computer readable storage medium 495, such as a floppy disc, tape, DVD/CD-ROM drive, memory card, or the like. In some embodiments, software components may also be loaded via the network interface 430, rather than via a computer readable storage medium 495.

Although an exemplary multi-out distribution server 400 has been described that generally conforms to conventional general purpose computing devices, a multi-out distribution server 400 may be any of a great number of devices capable of communicating with the network 150 and/or clients 105A-C, for example, a personal computer, a game console, a set-top box, a handheld computer, a cell phone, or any other suitable device.

Figure 5:
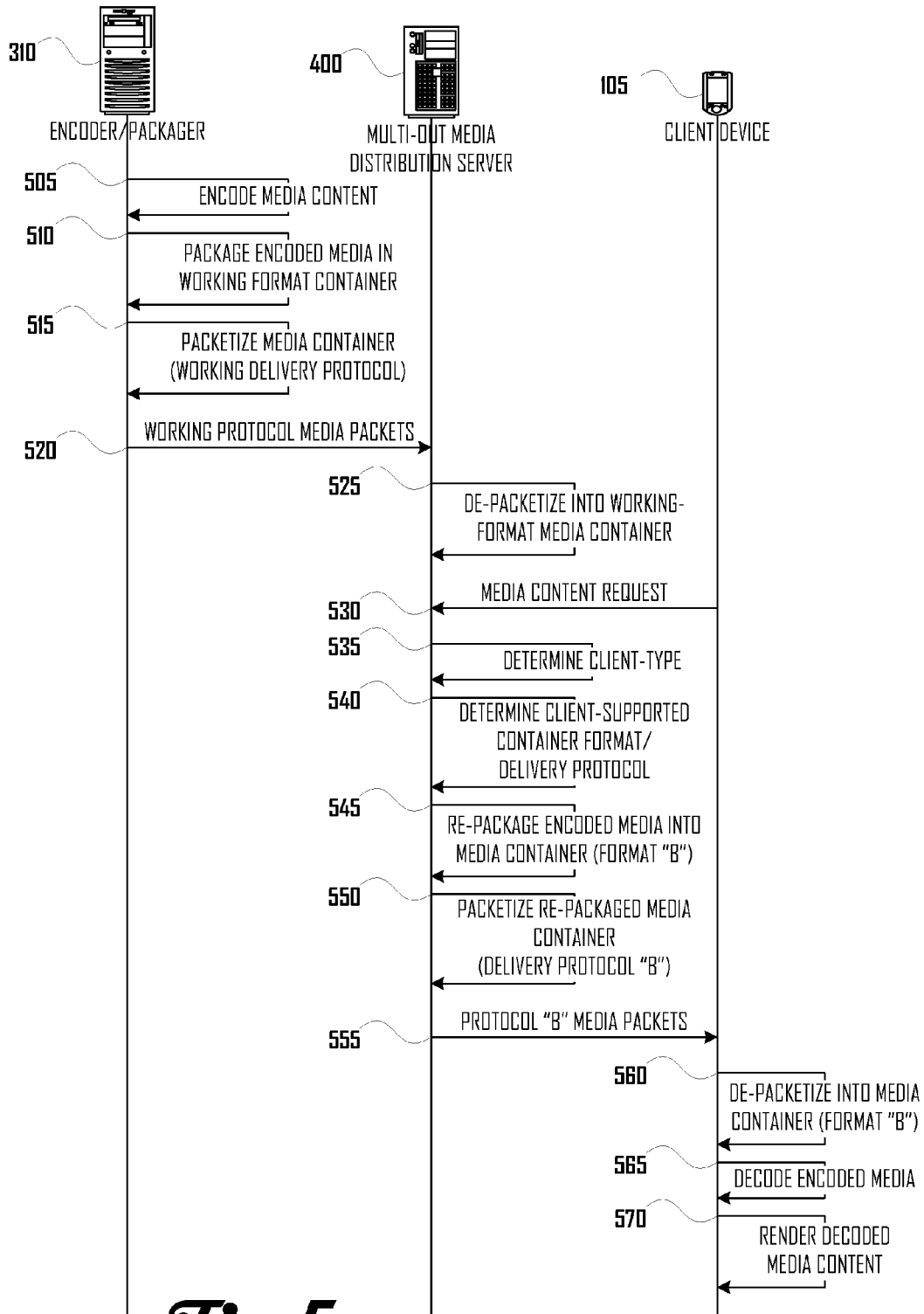
FIG. 5 illustrates an series of communications representative of an exemplary live streaming scenario, in accordance with one embodiment.

FIG. 5 illustrates a series of communications representative of an exemplary live streaming scenario involving encoder/packager 310, multi-out distribution server 400, and client device 105, in accordance with one embodiment. Encoder/packager 310 encodes 505 a piece of digital media content according to at least one common encoding format. For example, in one embodiment, encoder/packager 310 may encode video portions (if any) of the piece of digital media content according to the H.264 encoding format, and it may encode audio portions (if any) of the piece of digital media content according to the AAC encoding format.

After encoding the piece of digital media content according to at least one common encoding format, encoder/packager 310 packages 510 the encoded media into a working container format that is supported by multi-out distribution server 400. For example, in one embodiment, encoder/packager 310 may package 510 the encoded media into an MP4 format container.

After packaging the encoded media into the working-format container, encoder/packager 310 packetizes 515 the encoded media container, according to a working delivery protocol and/or the working container format, and sends 520 the resulting media packets to multi-out distribution server 400. For example, in one embodiment, encoder/packager 310 may packetize 515 the encoded media container according to the RTSP and/or RTP delivery protocols. Similarly, in one embodiment, encoder/packager 310 may deliver 515 the resulting media packets to multi-out distribution server 400 according to the RTSP/RTP or RTSP/RDT delivery protocols.

After receiving the working-delivery-protocol media packets, multi-out distribution server 400 reconstructs the working-container-format media container by de-packetizing 525 the media packets.

At some point, multi-out distribution server 400 receives 530 a request from client device 105 for the piece of media content encoded in the reconstructed working-container-format media container. After receiving the request, multi-out distribution server 400 determines 535 a client type of the requesting client device 105. For example, in some embodiments, the request may include an explicit indication of the client type. In other embodiments, the request may include an implicit indication of the client type (e.g., a client hardware and/or software type may be indicated via metadata incident to the request). In still other embodiments, multi-out distribution server 400 may determine a client type of the requesting client device 105 via additional communications (not shown) with client device 105.

Having determined 535 a client type of the requesting client device 105, multi-out distribution server 400 determines 540 a container format and/or delivery protocol that is supported by the requesting client device 105. For example, in one embodiment, a client hardware type may be determined to be an iPhone (or similar device) and/or a client software type may by determined to be Mobile Safari (both provided by Apple Inc. of Cupertino, Calif.). In such embodiments, these hardware and/or software client types may be known to support the MPEG-TS container format and the HTTP Live Streaming delivery protocol. In other embodiments, the client may be determined to be of a Flash Player type, which may be known to support the F4V container format and RTMP delivery protocol. In still other embodiments, the client may be determined to be of a Windows Media Client or Silverlight client type (both provided by Microsoft Corporation of Redmond, Wash.), which may be known to support the ASF container format and MS-WMSP delivery protocol other embodiments. In still other embodiments, the client may be determined to be of a RealPlayer type (provided by RealNetworks, Inc. of Seattle, Wash.), a QuickTime Player type (provided by Apple Inc. of Cupertino, Calif.), or an RTSP-capable mobile device type, which may be known to support the MP4 container format and the RTSP delivery protocol.

Having determined 540 a container format and/or delivery protocol that is supported by the requesting client device 105, multi-out distribution server 400 re-packages 545 the encoded media contained in the reconstructed working-container-format media container into the client-supported container format. In some embodiments, re-packaging the encoded media also includes re-packetizing 550 the client-supported-container-format container according to the client-supported delivery protocol (and/or the client-supported container format). This re-packaging 545 process does not require transcoding of the encoded media, nor does it even require decoding the encoded media. Because the re-packaged container includes the encoded media with no changes (unchanged) from the working-container-format media container, the re-packaging process may impose relatively little load on the multi-out distribution server 400 (at least compared to the load that would be imposed if re-packaging required transcoding, changing, or even merely decoding the encoded media in the working-container-format media container). Unlike previously-known streaming media delivery servers, a piece of media content is encoded only once, but can still be delivered to different client types supporting different container format and/or delivery protocols.

Having re-packaged 545 the encoded media into the client-supported container format (including re-packetizing 550 the client-supported-container-format container), multi-out distribution server 400 delivers the re-packetized media packets via the client-supported delivery protocol to client device 105.

Having received the media packets via a delivery protocol that it supports (is able to de-packetize), client device 105 de-packetizes 560 the media packets to reconstruct the client-supported-container-format container and decodes 565 the encoded media contained therein for rendering 570 on the client device 105.

Figure 6:
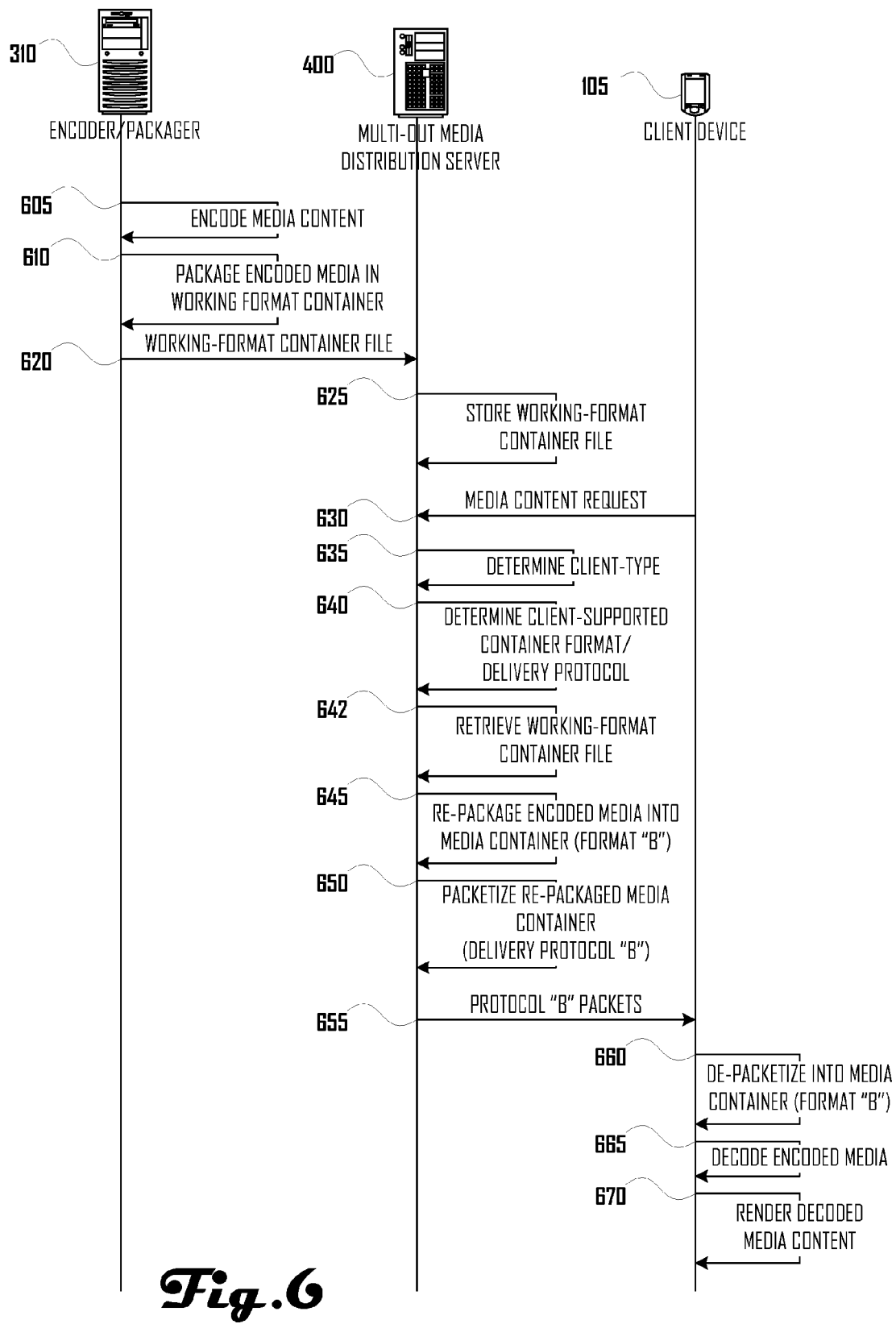
FIG. 6 illustrates a series of communications representative of an exemplary on-demand streaming scenario, in accordance with one embodiment.

FIG. 6 illustrates a series of communications representative of an exemplary on-demand streaming scenario involving encoder/packager 310, multi-out distribution server 400, and client device 105, in accordance with one embodiment. Encoder/packager 310 encodes 605 a piece of digital media content according to at least one common encoding format. For example, in one embodiment, encoder/packager 310 may encode video portions (if any) of the piece of digital media content according to the H.264 encoding format, and it may encode audio portions (if any) of the piece of digital media content according to the AAC encoding format.

After encoding the piece of digital media content according to at least one common encoding format, encoder/packager 310 packages 610 the encoded media into a working container format that is supported by multi-out distribution server 400. For example, in one embodiment, encoder/packager 310 may package 610 the encoded media into an MP4 format container.

After packaging the encoded media into the working-container-format media container, encoder/packager 310 sends 620 the working-container-format media container file to multi-out distribution server 400.

After receiving the working-container-format media container, multi-out distribution server 400 stores the working-container-format media container in a data store (e.g., in encoded media container repository 315, see FIG. 3).

At some point, multi-out distribution server 400 receives 630 a request from client device 105 for the piece of media content encoded in the stored working-container-format media container. After receiving the request, multi-out distribution server 400 determines 635 a client type of the requesting client device 105. For example, in some embodiments, the request may include an explicit indication of the client type. In other embodiments, the request may include an implicit indication of the client type (e.g., a client hardware and/or software type may be indicated via metadata incident to the request). In still other embodiments, multi-out distribution server 400 may determine a client type of the requesting client device 105 via additional communications (not shown) with client device 105.

Having determined 635 a client type of the requesting client device 105, multi-out distribution server 400 determines 640 a container format and/or delivery protocol that is supported by the requesting client device 105. For example, in one embodiment, a client hardware type may be determined to be an iPhone (or similar iOS device) and/or a client software type may by determined to be Mobile Safari (both provided by Apple Inc. of Cupertino, Calif.). In such embodiments, these hardware and/or software client types may be known to support the MPEG-TS container format and the HTTP Live Streaming delivery protocol. In other embodiments, the client may be determined to be of a Flash Player type, which may be known to support the F4V container format and RTMP delivery protocol. In still other embodiments, the client may be determined to be of a Windows Media Client or Silverlight client type (both provided by Microsoft Corporation of Redmond, Wash.), which may be known to support the ASF container format and MS-WMSP delivery protocol other embodiments. In still other embodiments, the client may be determined to be of a RealPlayer type (provided by RealNetworks, Inc. of Seattle, Wash.), a Quick-Time Player type (provided by Apple Inc. of Cupertino, Calif.), or an RTSP-capable mobile device type, which may be known to support the MP4 container format and the RTSP delivery protocol.

Having determined 640 a container format and/or delivery protocol that is supported by the requesting client device 105, multi-out distribution server 400 retrieves 642 working-container-format media container and re-packages 645 the encoded media contained therein into the client-supported container format. In some embodiments, re-packaging the encoded media also includes re-packetizing 650 the client-supported-container-format container according to the client-supported delivery protocol (and/or the client-supported container format). This re-packaging 645 process does not require transcoding of the encoded media, nor does it even require decoding the encoded media. Because the re-packaged container includes the encoded media with no changes (unchanged) from the working-container-format media container, the re-packaging process imposes little load on the multi-out distribution server 400 (at least compared to the load that would be imposed if re-packaging required transcoding, changing, or even merely decoding the encoded media in the working-container-format media container). Unlike previously-known streaming media delivery servers, a piece of media content is encoded only once, but can still be delivered to different client types supporting different container format and/or delivery protocols.

Having re-packaged 645 the encoded media into the client-supported container format (including re-packetizing 650 the client-supported-container-format container), multi-out distribution server 400 delivers the re-packetized media packets via the client-supported delivery protocol to client device 105.

Having received the media packets via a delivery protocol that it supports (is able to de-packetize), client device 105 de-packetizes 660 the media packets to reconstruct the client-supported-container-format container and decodes 665 the encoded media contained therein for rendering 670 on the client device 105.

Figure 7:
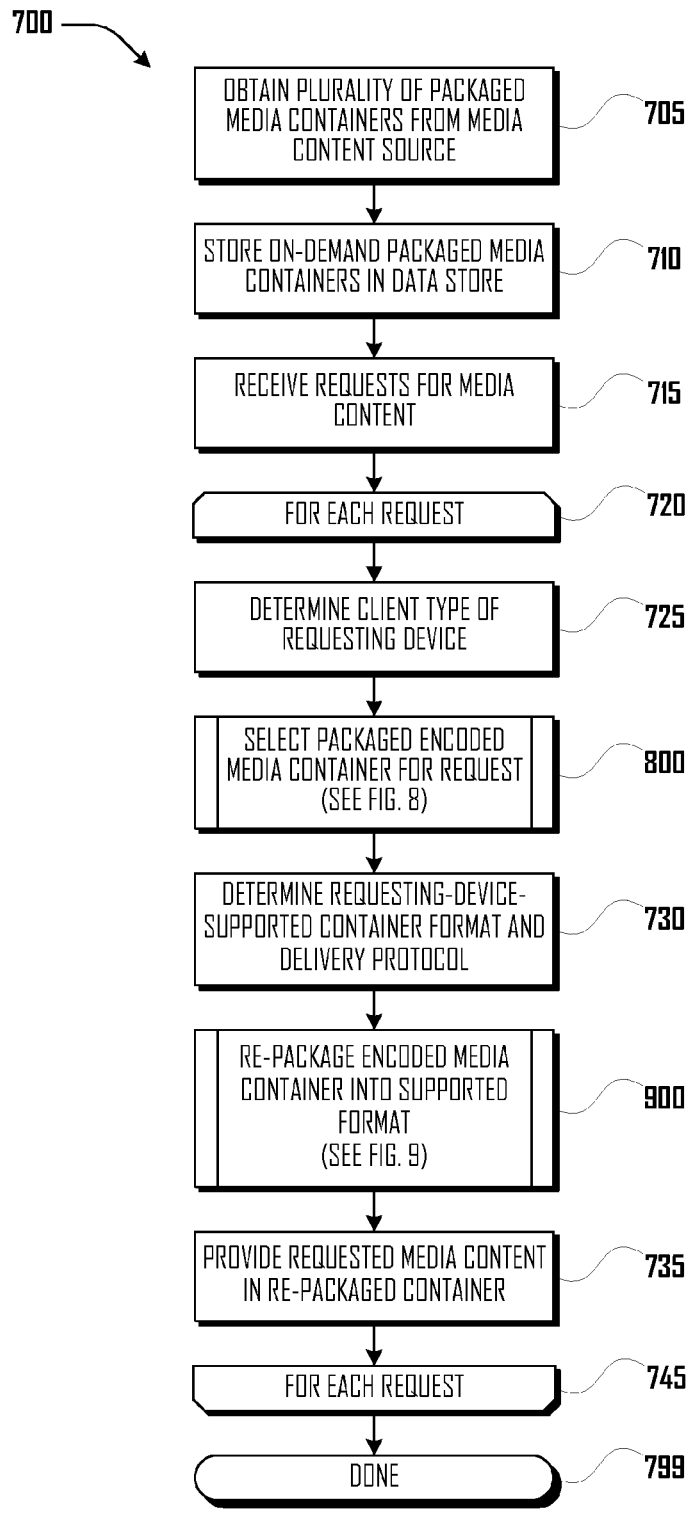
FIG. 7 illustrates an encoded-media re-packaging routine, in accordance with one embodiment.

FIG. 7 illustrates an encoded-media re-packaging routine 700, such as may be performed by multi-out distribution server 400 in accordance with one embodiment. In block 705, routine 700 obtains a plurality of packaged encoded media containers from a media content source. The plurality of packaged encoded media containers are packaged according to at least one working container format and/or at least one working delivery protocol. In various embodiments, the plurality of packaged encoded media containers may include one or more live packaged media streams and/or one or more on-demand media streams or files. For example, in one embodiment, one or more live packaged media streams may be obtained from encoder/packager 310, and/or one or more on-demand media streams or files may be obtained from encoded media container repository 315. (See discussions, above, of FIGS. 3 and 5-6).

In some embodiments, two or more of the plurality of packaged encoded media containers may correspond to a single piece of media content. For example, in one embodiment, routine 700 may obtain one or more higher-bitrate packaged encoded media containers corresponding to a particular piece of media content, as well as one or more lower-bitrate packaged encoded media containers corresponding to the same particular piece of media content. In other embodiments, routine 700 may obtain only a single packaged encoded media container corresponding to the particular piece of media content.

In block 710, routine 700 stores on-demand media streams or files (if any) among the plurality of packaged encoded media containers in a data store (e.g., encoded media container repository 315).

In block 715, routine 700 receives a plurality of requests for one or more pieces of media content corresponding to some or all of the plurality of packaged encoded media containers obtained in block 705. Beginning in loop block 720, routine 700 processes each request.

In block 725, routine 700 determines a client type of the requesting device. For example, in some embodiments, the request may include an explicit indication of the client type. In other embodiments, the request may include an implicit indication of the client type (e.g., a client hardware and/or software type may be indicated via metadata incident to the request). In still other embodiments, multi-out distribution server 400 may determine a client type of the requesting client device 105 via additional communications (not shown) with client device 105. In one embodiment, the determined client type may be one of the following exemplary types: an iPhone (or similar device provided by Apple Inc. of Cupertino, Calif.) type; an Adobe Flash Player (provided by Adobe Systems Incorporated of Mountain View, Calif.) type; a Windows Media Client or Silverlight client (both provided by Microsoft Corporation of Redmond, Wash.) type; a RealPlayer (provided by RealNetworks, Inc. of Seattle, Wash.) type; a QuickTime Player (provided by Apple Inc. of Cupertino, Calif.) type; or an RTSP-capable mobile device type.

In subroutine block 800 (see FIG. 8, discussed below), routine 700 selects one of the plurality of packaged encoded media containers that corresponds to the current requested piece of media content. In some embodiments, if there are multiple packaged encoded media containers corresponding to the current requested piece of media content, the selection subroutine may also take into account the client type of the current requesting device or other characteristics of the request and/or requesting device.

In block 730, routine 700 determines a container format and/or delivery protocol that are supported by the determined client type. In some embodiments, this determination may be made dynamically, via communication with the requesting client. In other embodiments, routine 700 may simply select an appropriate container format and/or delivery protocol from a data structure associating or more known client types with one or more previously-determined supported container formats and/or delivery protocols.

For example, in one embodiment, client types may be mapped to supported container formats and/or delivery protocols in a manner similar to that set out in Table 1.

TABLE 1

| Client type | Supported container format | Supported delivery protocol |
| --- | --- | --- |
| iPhone (or similar device) type | MPEG-TS | HTTP Live Streaming |
| Adobe Flash Player type | F4V | RTMP |
| Silverlight client type | ASF | MS-WMSP |

TABLE 1-continued

| Client type | Supported container format | Supported delivery protocol |
|---|---|---|
| Windows Media Client type | ASF | MS-WMSP |
| RealPlayer type | MP4 | RTSP |
| QuickTime Player type | MP4 | RTSP |
| RTSP-capable mobile device type | MP4 | RTSP |

In subroutine block 900 (see FIG. 9, discussed below), routine 700 re-packages the packaged encoded media container that was selected in subroutine block 800 according to the container format and/or delivery protocol that was determined in block 730 to be supported by the requesting client.

In block 735, routine 700 provides the requested media content, as re-packaged according to the container format and/or delivery protocol that was determined in block 730 to be supported by the requesting client. For example, in one embodiment, routine 700 may include streaming the re-packaged media container to the requesting client according to the delivery protocol that was determined in block 730 to be supported by the requesting client.

In ending loop block 745, routine 700 loops back to block 720 to process the next request (if any). Routine 700 ends in block 799.

Figure 8:
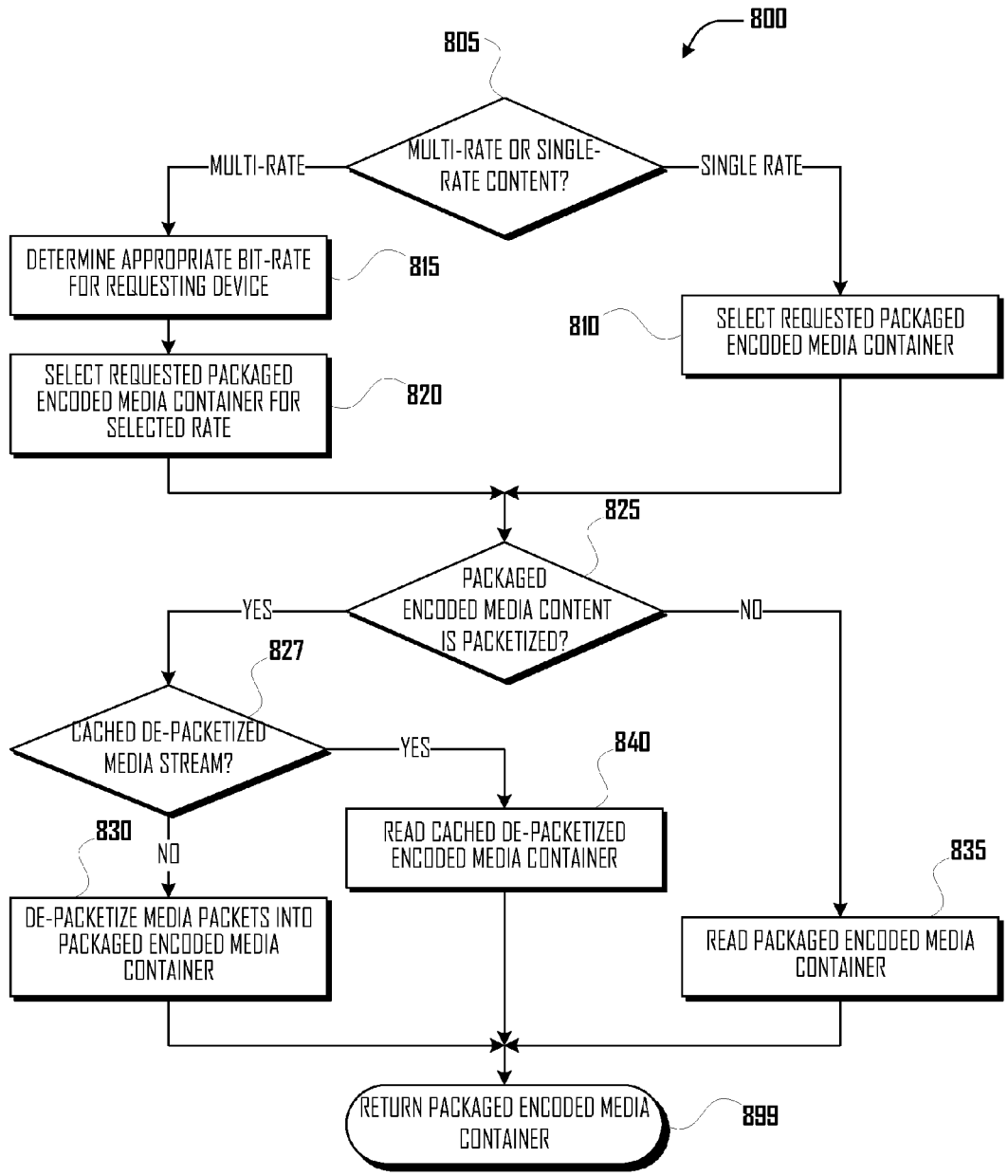
FIG. 8 illustrates a packaged-media-contained selection subroutine, in accordance with one embodiment.

FIG. 8 illustrates a subroutine 800 for selecting an appropriate packaged media container for a media content request in accordance with one embodiment. In decision block 805, subroutine 800 determines whether there is more than one media container corresponding to the requested piece of media content (e.g., whether the requested piece of media content has been encoded at various bit-rates). If there is only a single bit-rate or a single container corresponding to the requested piece of media content, then in block 810, subroutine 800 selects that packaged encoded media container (from among the plurality of available live and/or on-demand media containers).

If there are multiple containers corresponding to the requested piece of media content, then in block 815, subroutine 800 determines a bit-rate that is appropriate for the requesting client. In some embodiments, determining the bit-rate that is appropriate for the requesting client may include determining a media rendering capability of the requesting client according to its client type. For example, clients corresponding to different types of devices may have different display resolutions (e.g., clients corresponding to a first mobile device type may have a display resolution of 480×320 pixels, clients corresponding to a second mobile device type may have a display resolution of 960×640 pixels, clients corresponding to a first laptop device type may have a display resolution of 1280×800 pixels, and the like). Similarly, the data-throughput capacity of a mobile data network may limit the media rendering capability of some clients corresponding to various mobile device types. Accordingly, in some embodiments, a lower-bit-rate encoded media container may be appropriate for clients having lower display resolutions and/or lower data-throughput capacities, while a higher-bit-rate encoded media container may be appropriate for clients having higher display resolutions and/or higher data-throughput capacities.

In block 820, subroutine 800 selects an appropriate packaged encoded media container according to the determined bit-rate.

In decision block 825, subroutine 800 determines whether the selected packaged encoded media container is packetized. If not, then in block 835, the selected packaged encoded media container can be read directly (e.g., from encoded media container repository 315).

If, on the other hand, the selected packaged encoded media container is packetized, then in decision block 827, subroutine 800 determines whether a de-packetized copy of the selected packaged encoded media container has been cached. If so, then in block 840, subroutine 800 reads the cached de-packetized selected packaged encoded media container. If a de-packetized copy of the selected packaged encoded media container has not been cached, then in block 830, subroutine 800 de-packetized the media packets into the selected packaged encoded media container. In some embodiments, subroutine 800 may also cache the de-packetized selected packaged encoded media container for re-use.

In block 899, subroutine 800 ends, returning at least a portion of the selected packaged encoded media container to the caller.

Figure 9:
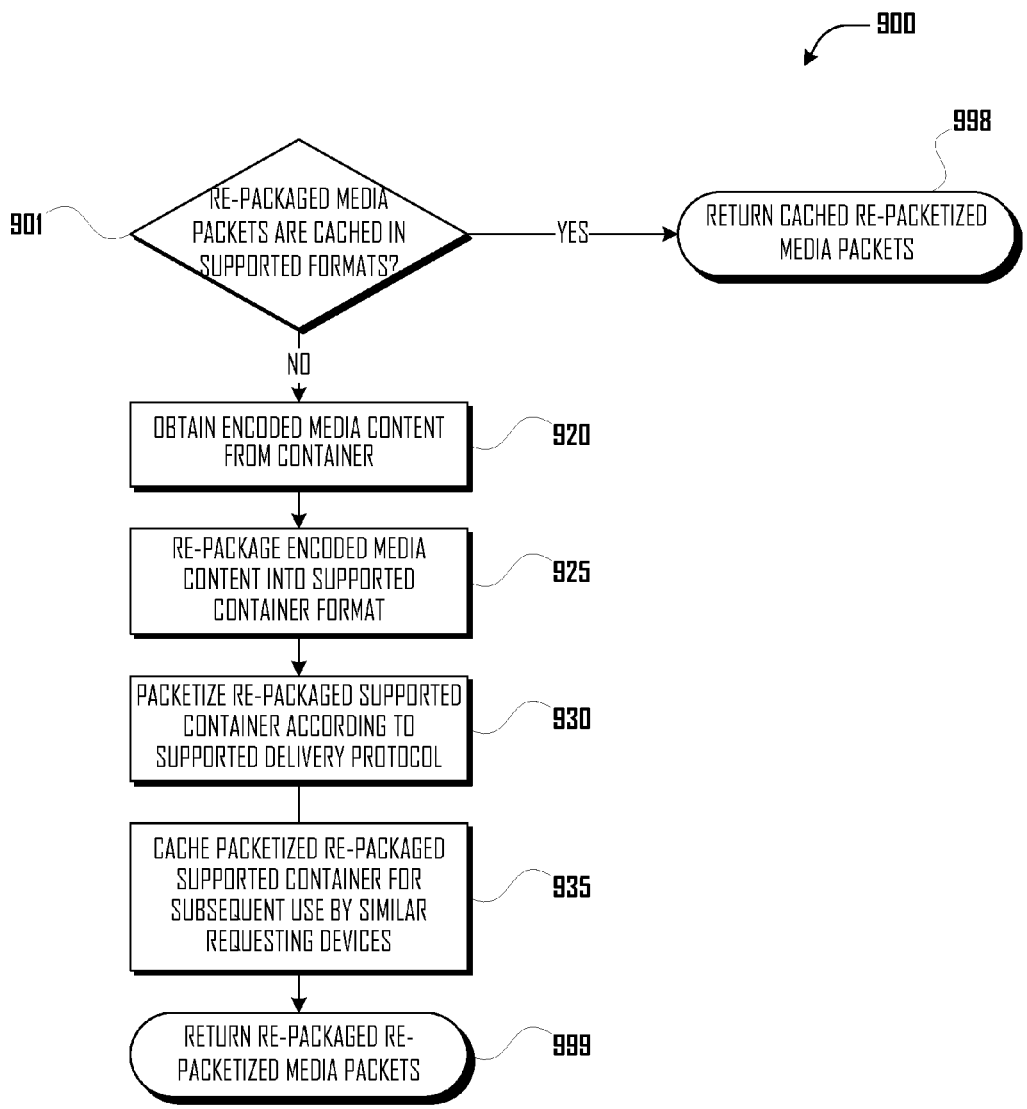
FIG. 9 illustrates a packaged encoded media container re-packaging sub-routine, in accordance with one embodiment.

FIG. 9 illustrates a packaged encoded media container re-packaging sub-routine 900 in accordance with one embodiment. In decision block 901, sub-routine 900 determines whether the current packaged encoded media container has already been re-packaged into the current container format and delivery protocol, and cached for re-use. If so, in block 998, sub-routine 900 ends, returning the re-packaged media packets from cache.

If the current packaged encoded media container is not cached, having already been re-packaged into the current container format and delivery protocol, then in block 920, sub-routine 900 reads at least a portion of the encoded media content from the current working-container-format container. Without transcoding or otherwise changing the encoded media content, and without even decoding the encoded media content, in block 925, sub-routine 900 re-packages the unchanged encoded media content into the supported container format. In various embodiments, this process may involve editing, removing, and/or adding headers; re-arranging atoms, blocks, frames, or other fragments of encoded media; and the like. Because the supported-container-format media container includes the encoded media with no changes (unchanged) from the working-container-format media container, the re-packaging process may impose relatively little load on the multi-out distribution server 400 (at least compared to the load that would be imposed if re-packaging required transcoding, changing, or even merely decoding the encoded media in the working-container-format media container).

In block 930, sub-routine 900 further prepares the supported-container-format media container for delivery to the requesting client by packetizing the supported-container-format media container according to the supported container format and/or supported delivery protocol. If the subject encoded media content was originally received in packetized form, the re-packetized media packets may differ from the originally-received media packets in size; in the number, content, and/or arrangement of headers and other metadata; and the like.

In block 935, sub-routine 900 may cache the re-packaged, re-packetized media packets for re-use by other clients requesting the same piece of media content that support the same container format and/or delivery protocol as the current request.

In block 999, sub-routine 900 ends, returning the re-packetized re-packaged media packets to the caller.

Figure 10:
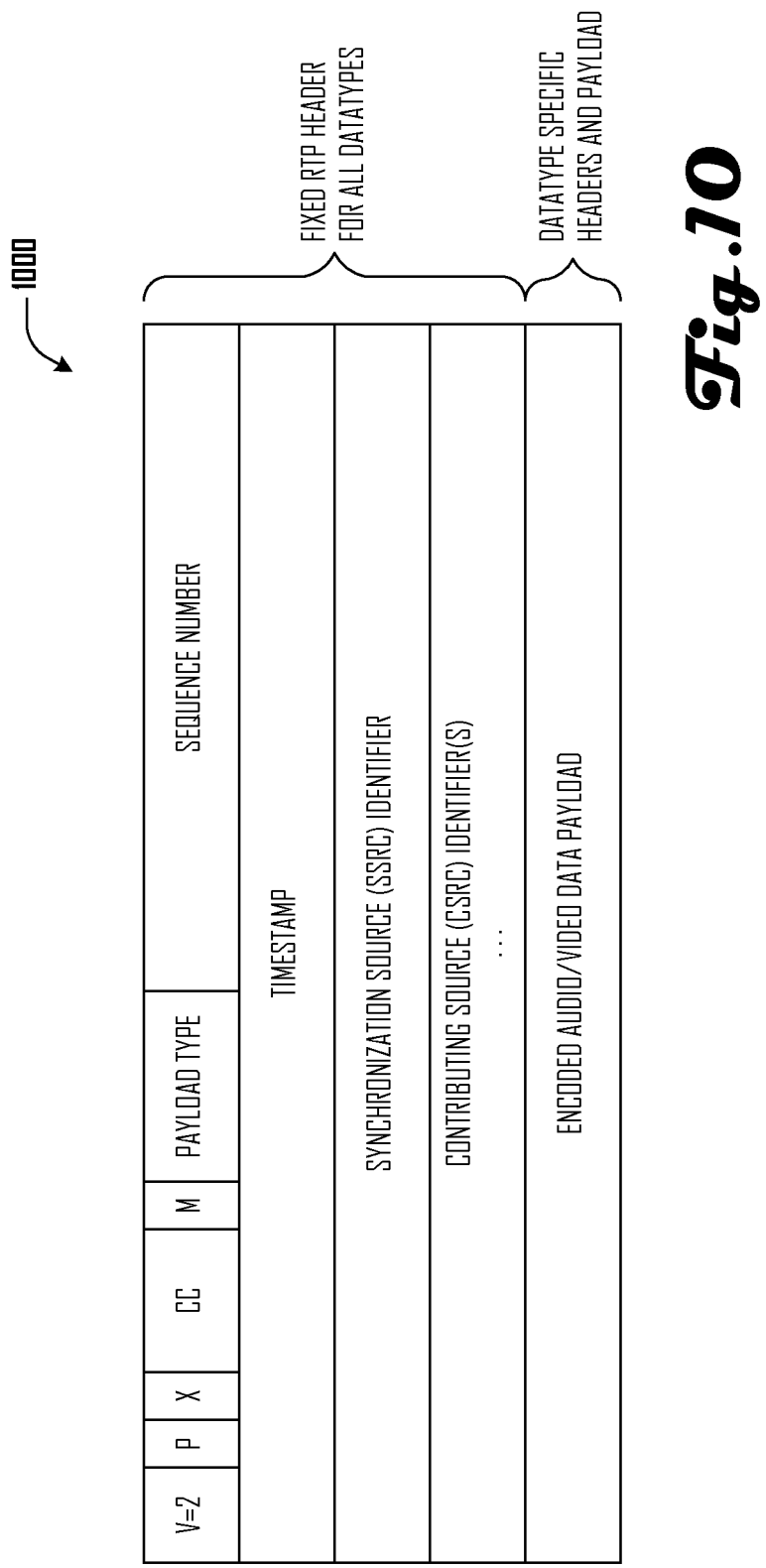
FIG. 10 illustrates an RTP media packet, such as may be employed in various embodiments.

FIG. 10 illustrates the format of an RTP media packet 1000, such as may be employed in various embodiments. The RTP header has a minimum size of 12 bytes. After the header, optional header extensions may be present, followed by the Encoded Audio/video data payload. The packet 1000 is constructed as follows:

- V: (2 bits) Indicates the version of the protocol. The current version is 2.
- P (Padding): (1 bit) Indicated whether there are extra padding bytes at the end of the RTP media packet 1000.
- X (Extension): (1 bit) Indicates presence of Extension headers before the payload data.
- CC (CSRC Count): (4 bits) Indicates the number of CSRC identifiers (if any, see below).
- M (Marker): (1 bit) Meaning depends on the payload.
- PT (Payload Type): (7 bits) Indicates the format of the payload.
- Sequence Number: (16 bits) Packet sequence number.
- Timestamp: (32 bits) RTP timestamp.
- SSRC: (32 bits) Indicated the source of the media packet stream.
- CSRC: (0-15 items, if present, 32 bits each) Contributing source identifiers.
- Encoded Audio/video data payload: This field generally contains one or more headers (defined by the appropriate packetization RFC for the datatype) followed by the encoded media payload data (which may include a single frame, multiple frames, or a fragment of a frame of media data).

Figure 11:
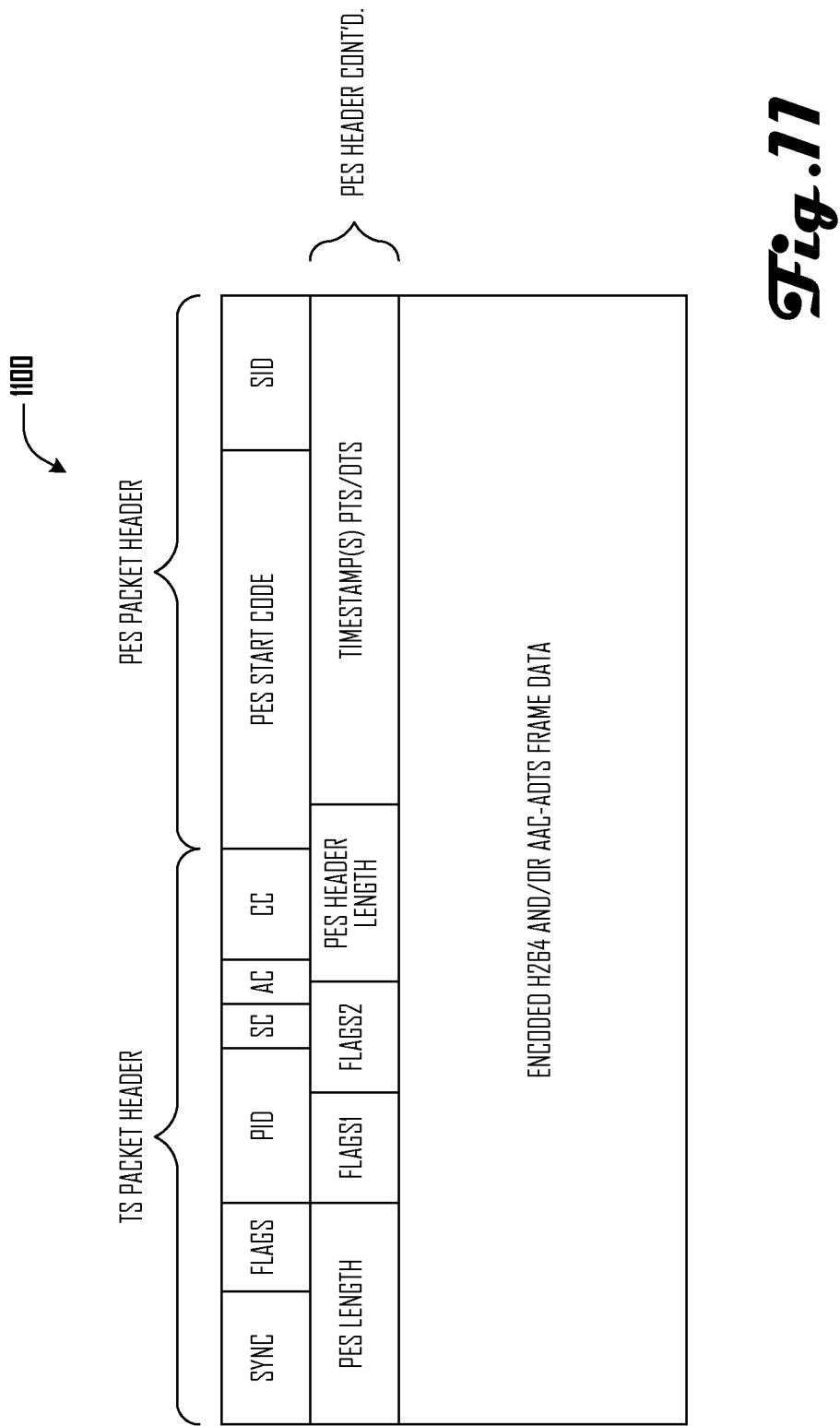
FIG. 11 illustrates an MPEG-TS media packet, such as may be employed in various embodiments.

FIG. 11 illustrates the format of an MPEG-TS media packet 1100, such as may be employed in various embodiments. The MPEG-TS media packet 1100 is the basic unit of data in an MPEG-TS transport stream. MPEG-TS media packet 1100 are 188 bytes in length, but the communication medium may add some error correction bytes to the packet. A MPEG-TS media packet 1100 is constructed as follows:

- Sync: (8 bits) Sync Byte-0x47.
- Flags: (3 bits) Error indicator bit, payload start bit & priority bit.
- PID: (13 bits) Packet Identifier
- SC: (2 bits) Scrambling control if scrambling is used.
- AC: (2 bits) Adaptation control for stuffing bytes and carrying Program clock reference ("PCR")
- CC: (4 bits) Continuity Counter. Incremented by 1 for each TS packet with same PID.
- PES Start Code: (24 bits) 0x00 0x00 0x01.
- SID: (8 bits) Stream ID of the datatype being carried in TS packet
- PES Length: (16 bits) Length of PES packet after this field.
- Flags1: (8 bits) Scrambling control, priority, copyright, Presentation TimeStamp ("PTS")/Decode TimeStamp ("DTS") flags.
- Flags2: (8 bits) Extension flags
- PES Header Length: (8 bits) Length of optional headers
- TimeStamps: PTS, 5 bytes; DTS, 5 bytes.
- Encoded H.264 and/or AAC-ADTS frame data—Actual payload encoded media data. As MPEG-TS media packet 1100 is 188 bytes long, frames s exceeding 188 bytes are split across multiple MPEG-TS media packets 1100, with only the first MPEG-TS media packet 1100 having the PES header.

Although specific embodiments have been illustrated and described herein, it will be appreciated by those of ordinary skill in the art that a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A method of delivering media from a media distribution server, the method comprising:
   obtaining, by the media distribution server, a first digital media stream comprising first digital media data corresponding to a piece of media content, said first digital media data being encoded in an original encoding format, according to a first set of encoding parameters, and packaged in an original container format;
   obtaining, by the media distribution server, a second digital media stream comprising second digital media data corresponding to said piece of media content, said second digital media data being encoded in said original encoding format according to a second set of encoding parameters that is different from said first set of encoding parameters;
   receiving, by the media distribution server, a plurality of requests to deliver said piece of media content respectively to a plurality of remote clients of a plurality of differing client types, each of said plurality of differing client types supporting said original encoding format, but not supporting said original container format; and
   for each of said plurality of requests:
      determining a container format and delivery protocol supported by the current remote client associated with the current request according to a client type of the current remote client;
      determining a media rendering capability of the current remote client according to the client type of the current remote client;
      selecting said first digital media stream from a group comprising said first and second digital media streams according to said determined media rendering capability of the current remote client and said first set of encoding parameters;
      dynamically re-packaging said first digital media stream into a digital media stream comprising said first digital media data encoded unchanged in said original encoding format and re-packetized according to said determined supported container format and said determined supported delivery protocol; and
      providing said dynamically re-packaged digital media stream from the media distribution server for delivery to said current remote client according to said determined supported delivery protocol.

2. The method of claim 1, wherein obtaining said first digital media stream comprises receiving a multiplicity of media packets from a real-time encoder device.

3. The method of claim 1, wherein said first digital media stream comprises a multiplicity of media packets, and wherein dynamically re-packaging said first digital media stream comprises:
   de-packetizing said multiplicity of media packets to obtain a portion of said encoded first digital media data; and
   without decoding said portion of said encoded first digital media data, packetizing said portion of said encoded first digital media data into a second multiplicity of media packets according to said dynamically-determined supported container format and said determined supported delivery protocol.

4. The method of claim 1, wherein:
   said original encoding format is one of Advanced Audio Coding ("AAC") format and H.264 format;
   said dynamically-determined supported container format is one of 3GP (or 3GPP) container format, 3G2 (or 3GPP2) container format, MPEG-4 Part 14 ("MP4") container format, and F4V Flash Video container format; and said dynamically-determined supported delivery protocol is one of Real Time Streaming Protocol ("RTSP"), Real Time Messaging Protocol ("RTMP"), Hypertext Transfer Protocol ("HTTP") Live Streaming, and Windows Media HTTP Streaming Protocol ("MS-WMSP" or "MMSH").

5. An apparatus comprising a processor and a memory storing instructions that, when executed by the processor, configure the apparatus to deliver media according to a method comprising:

obtaining a first digital media stream comprising first digital media data corresponding to a piece of media content, said first digital media data being encoded in an original encoding format, according to a first set of encoding parameters, and packaged in an original container format;

obtaining a second digital media stream comprising second digital media data corresponding to said piece of media content, said second digital media data being encoded in said original encoding format according to a second set of encoding parameters that is different from said first set of encoding parameters;

receiving a plurality of requests to deliver said piece of media content respectively to a plurality of remote clients of a plurality of differing client types, each of said plurality of differing client types supporting said original encoding format, but not supporting said original container format; and for each of said plurality of requests:
determining a container format and delivery protocol supported by the current remote client associated with the current request according to a client type of the current remote client;
determining a media rendering capability of the current remote client according to the client type of the current remote client;
selecting said first digital media stream from a group comprising said first and second digital media streams according to said determined media rendering capability of the current remote client and said first set of encoding parameters;
dynamically re-packaging said first digital media stream into a digital media stream comprising said first digital media data encoded unchanged in said original encoding format and re-packetized according to said determined supported container format and said determined supported delivery protocol; and
providing said dynamically re-packaged digital media stream for delivery to said current remote client according to said determined supported delivery protocol.

6. The apparatus of claim 5, wherein said first digital media stream comprises a multiplicity of media packets, and wherein dynamically re-packaging said first digital media stream comprises:

de-packetizing said multiplicity of media packets to obtain a portion of said encoded first digital media data; and without decoding said portion of said encoded first digital media data, packetizing said portion of said encoded first digital media data into a second multiplicity of media packets according to said dynamically-determined supported container format and said determined supported delivery protocol.

7. A non-transient computer readable storage medium storing instructions that, when executed by a processor, configure the processor to deliver media according to a method comprising:

obtaining a first digital media stream comprising first digital media data corresponding to a piece of media content, said first digital media data being encoded in an original encoding format, according to a first set of encoding parameters, and packaged in an original container format;

obtaining a second digital media stream comprising second digital media data corresponding to said piece of media content, said second digital media data being encoded in said original encoding format according to a second set of encoding parameters that is different from said first set of encoding parameters;

receiving a plurality of requests to deliver said piece of media content respectively to a plurality of remote clients of a plurality of differing client types, each of said plurality of differing client types supporting said original encoding format, but not supporting said original container format; and for each of said plurality of requests:
determining a container format and delivery protocol supported by the current remote client associated with the current request according to a client type of the current remote client;
determining a media rendering capability of the current remote client according to the client type of the current remote client;
selecting said first digital media stream from a group comprising said first and second digital media streams according to said determined media rendering capability of the current remote client and said first set of encoding parameters;
dynamically re-packaging said first digital media stream into a digital media stream comprising said first digital media data encoded unchanged in said original encoding format and re-packetized according to said determined supported container format and said determined supported delivery protocol; and
providing said dynamically re-packaged digital media stream for delivery to said current remote client according to said determined supported delivery protocol.

8. The non-transient computer readable storage medium of claim 7, wherein said first digital media stream comprises a multiplicity of media packets, and wherein dynamically re-packaging said first digital media stream comprises:

de-packetizing said multiplicity of media packets to obtain a portion of said encoded first digital media data; and without decoding said portion of said encoded first digital media data, packetizing said portion of said encoded first digital media data into a second multiplicity of media packets according to said dynamically-determined supported container format and said determined supported delivery protocol.

9. A method of delivering media from a media distribution server, the method comprising:

receiving, by the media distribution server, an encoded media file from an encoder device said encoded media file comprising first digital media data corresponding to a piece of media content, said first digital media data being encoded in an original encoding format, according to a first set of encoding parameters, and packaged in an original container format;

obtaining, by the media distribution server, a second digital media stream comprising second digital media data corresponding to said piece of media content, said second digital media data being encoded in said original encoding format according to a second set of encoding parameters that is different from said first set of encoding parameters;

receiving, by the media distribution server, a plurality of requests to deliver said piece of media content respectively to a plurality of remote clients of a plurality of differing client types, each of said plurality of differing client types supporting said original encoding format, but not supporting said original container format; and for each of said plurality of requests:

determining a container format and delivery protocol supported by the current remote client associated with the current request according to a client type of the current remote client;

determining a media rendering capability of the current remote client according to the client type of the current remote client;

selecting said first digital media stream from a group comprising said first and second digital media streams according to said determined media rendering capability of the current remote client and said first set of encoding parameters;

obtaining a re-packaged digital media stream comprising said first digital media data encoded unchanged in said original encoding format and re-packetized according to said determined supported container format and said determined supported delivery protocol; and providing said dynamically re-packaged digital media stream from the media distribution server for delivery to said current remote client according to said determined supported delivery protocol.

10. The method of claim 9, wherein obtaining said re-packaged digital media stream comprises dynamically re-packetizing said encoded media file.

11. The method of claim 10, wherein dynamically re-packetizing said encoded media file comprises:

reading a portion of said encoded first digital media data from said encoded media file; and without decoding said portion of said encoded first digital media data, packetizing said portion of said encoded first digital media data into a multiplicity of media packets according to said determined supported container format.

12. The method of claim 9, further comprising, for each of said plurality of remote clients, caching said dynamically re-packaged digital media stream for delivery to other remote clients of the same client type as the current remote client.

13. An apparatus comprising a processor and a memory storing instructions that, when executed by the processor, configure the apparatus to deliver media according to a method comprising:

receiving an encoded media file from an encoder device said encoded media file comprising first digital media data corresponding to a piece of media content, said first digital media data being encoded in an original encoding format, according to a first set of encoding parameters, and packaged in an original container format;

obtaining a second digital media stream comprising second digital media data corresponding to said piece of media content, said second digital media data being encoded in said original encoding format according to a second set of encoding parameters that is different from said first set of encoding parameters;

receiving a plurality of requests to deliver said piece of media content respectively to a plurality of remote clients of a plurality of differing client types, each of said plurality of differing client types supporting said original encoding format, but not supporting said original container format; and for each of said plurality of requests:

determining a container format and delivery protocol supported by the current remote client associated with the current request according to a client type of the current remote client;

determining a media rendering capability of the current remote client according to the client type of the current remote client;

selecting said first digital media stream from a group comprising said first and second digital media streams according to said determined media rendering capability of the current remote client and said first set of encoding parameters;

obtaining a re-packaged digital media stream comprising said first digital media data encoded unchanged in said original encoding format and re-packetized according to said determined supported container format and said determined supported delivery protocol; and providing said dynamically re-packaged digital media stream for delivery to said current remote client according to said determined supported delivery protocol.

14. The apparatus of claim 13, wherein obtaining said re-packaged digital media stream comprises:

reading a portion of said encoded first digital media data from said encoded media file; and without decoding said portion of said encoded first digital media data, dynamically packetizing said portion of said encoded first digital media data into a multiplicity of media packets according to said determined supported container format.

15. An non-transient computer readable storage medium storing instructions that, when executed by a processor, configure the processor to deliver media according to a method comprising:

receiving an encoded media file from an encoder device said encoded media file comprising first digital media data corresponding to a piece of media content, said first digital media data being encoded in an original encoding format, according to a first set of encoding parameters, and packaged in an original container format;

obtaining a second digital media stream comprising second digital media data corresponding to said piece of media content, said second digital media data being encoded in said original encoding format according to a second set of encoding parameters that is different from said first set of encoding parameters;

receiving a plurality of requests to deliver said piece of media content respectively to a plurality of remote clients of a plurality of differing client types, each of said plurality of differing client types supporting said original encoding format, but not supporting said original container format; and for each of said plurality of requests:

determining a container format and delivery protocol supported by the current remote client associated with the current request according to a client type of the current remote client;

determining a media rendering capability of the current remote client according to the client type of the current remote client;

selecting said first digital media stream from a group comprising said first and second digital media streams according to said determined media rendering capability of the current remote client and said first set of encoding parameters;

obtaining a re-packaged digital media stream comprising said first digital media data encoded unchanged in said original encoding format and re-packetized according to said determined supported container format and said determined supported delivery protocol; and providing said dynamically re-packaged digital media stream for delivery to said current remote client according to said determined supported delivery protocol.

16. The non-transient computer readable storage medium of claim 15, wherein obtaining said re-packaged digital media stream comprises:

reading a portion of said encoded first digital media data from said encoded media file; and without decoding said portion of said encoded first digital media data, dynamically packetizing said portion of said encoded first digital media data into a multiplicity of media packets according to said determined supported container format.

* * * * *

UNITED STATES PATENT AND TRADEMARK OFFICE
CERTIFICATE OF CORRECTION

PATENT NO. : 8,521,899 B2  
APPLICATION NO. : 12/838325  
DATED : August 27, 2013  
INVENTOR(S) : Aashima Narula et al.

Page 1 of 1

It is certified that error appears in the above-identified patent and that said Letters Patent is hereby corrected as shown below:

On the title page, in item (56), in column 2, under "Other Publications", line 1, delete "Recordand" and insert -- Record and --, therefor.

Signed and Sealed this
Tenth Day of December, 2013

Margaret A. Focarino
*Commissioner for Patents of the United States Patent and Trademark Office*